(12) United States Patent
Morein et al.

(10) Patent No.: US 6,407,741 B1
(45) Date of Patent: Jun. 18, 2002

(54) METHOD AND APPARATUS FOR CONTROLLING COMPRESSED Z INFORMATION IN A VIDEO GRAPHICS SYSTEM THAT SUPPORTS ANTI-ALIASING

(75) Inventors: Steven Morein, Cambridge; Michael T. Wright, Marlborough, both of MA (US)

(73) Assignee: ATI International SRL, Barbados (KN)

( * ) Notice: Subject to any disclaimer, the term of this patent is extended or adjusted under 35 U.S.C. 154(b) by 0 days.

(21) Appl. No.: 09/356,790

(22) Filed: Jul. 20, 1999

Related U.S. Application Data

(63) Continuation-in-part of application No. 09/141,797, filed on Aug. 28, 1998.

(51) Int. Cl.[7] .......................... G06T 9/00; G06T 15/00
(52) U.S. Cl. ................... 345/555; 345/422; 345/557
(58) Field of Search ............................... 345/421, 422, 345/555, 501, 557, 563, 530, 545; 382/239, 251, 232, 237

(56) References Cited

U.S. PATENT DOCUMENTS

| | | | | |
|---|---|---|---|---|
| 5,729,669 A | * | 3/1998 | Appleton ..................... | 345/422 |
| 5,808,618 A | * | 9/1998 | Kawano et al. ............. | 345/422 |
| 5,819,017 A | * | 10/1998 | Akeley et al. ............... | 345/421 |
| 5,995,120 A | * | 11/1999 | Dye ............................ | 345/501 |
| 6,104,837 A | * | 8/2000 | Walker ........................ | 345/421 |

* cited by examiner

*Primary Examiner*—Kee M. Tung
(74) *Attorney, Agent, or Firm*—Vedder, Price, Kaufman & Kammholz

(57) ABSTRACT

A method and apparatus for managing compressed Z information in a video graphics system that supports anti-aliasing is described. Each pixel in the display frame is represented with a primary Z value, a secondary Z value, a first and second color, and a pixel mask that indicates how the Z values and colors apply to the samples of the pixel. The primary Z values for the pixels in a pixel block are then compressed using a compression algorithm and stored in a Z buffer in a compressed format. A secondary mask that indicates which pixels in the pixel block have valid secondary Z values is also stored in the Z buffer, along with the secondary Z values and the pixel masks in an uncompressed format. A Z mask value for each pixel block in the frame is stored in a Z mask memory, where the Z mask for each pixel block indicates the level of compression of the Z information the corresponding pixel block. When Z information for a pixel block is required for processing operations, a cache is first examined to determine if the Z information for the pixel block is included in the cache. If the Z information is not included in the cache, the Z mask memory is consulted to determine the level of compression of the Z information for the particular pixel block. Based on the indication provided by the Z mask memory as to the level of compression, a predetermined amount of buffered Z information is retrieved from the Z buffer, and when the Z information is in compressed format, it is decompressed. The fetched Z information is then stored in the cache for use in video graphics processing.

21 Claims, 5 Drawing Sheets

METHOD AND APPARATUS FOR CONTROLLING COMPRESSED Z INFORMATION IN A VIDEO GRAPHICS SYSTEM THAT SUPPORTS ANTI-ALIASING

RELATED APPLICATIONS

This application is a continuation in part of: application Ser. No. 09/141,797 entitled "METHOD AND APPARATUS FOR VIDEO GRAPHICS ANTIALIASING" which was filed on Aug. 28, 1998; and application Ser. No. 09/369,730 entitled "METHOD AND APPARATUS FOR CONTROLLING COMPRESSED Z INFORMATION IN A VIDEO GRAPHICS SYSTEM".

FIELD OF THE INVENTION

The invention relates generally to video graphics processing and more particularly to a method and apparatus for managing compressed Z information in a video graphics system that supports anti-aliasing.

BACKGROUND OF THE INVENTION

Computers are used in many applications. As computing systems continue to evolve, the graphical display requirements of the systems become more demanding. This is especially true in the area of three-dimensional (3D) graphics processing. In order to process 3D graphics images, the position of graphics primitives with respect to the display must be understood in all three dimensions. This includes the dimension of depth, often referred to as the Z dimension. The Z dimension describes the positioning of a video graphics primitive with respect to other video graphics primitives within the display frame in terms of the depth, or distance from the viewer, of the video graphics primitives.

Computer displays and other high resolution display devices such as high definition televisions (HDTVs), projectors, printers, plotters, and the like, present an image to the viewer as an array of individual picture elements, or pixels. The individual pixels are given a specific color, which corresponds to the color of the image at the location of the particular pixel. The pixels are closely spaced, and the viewer's visual system performs a filtering of individual pixel colors to form a composite image. If the partitioning of the image into individual pixel elements is performed properly, and the pixels are close enough together, the viewer perceives the displayed array of pixels as a virtually continuous image.

In many systems, graphical images for display are sampled, and the image is regenerated based on the stored samples. When the conservation of the detail is important, oversampling is typically utilized in order to avoid aliasing in the reconstructed graphical image. Oversampling techniques are well known in the art. In an oversampling system, multiple samples of each screen element, or pixel, are stored. Although each pixel is rendered using only a single color value, each of the samples for that particular pixel are used in generating the final color. In effect, a much more detailed, or higher-resolution, version of the image is stored within the computer, and this version is used to generate each of the colors for the pixels displayed on the screen.

Conventional oversampling systems in video graphics systems can require large amounts of memory. For example, if a system stores 8 samples for each particular pixel in memory and each sample includes 16 bits of color information and a 16-bit depth, or "Z", value, the memory requirements for a high-quality image which is 640×480 pixels is nearly 10 million bytes. The disadvantages of this amount of memory usage are apparent. First, the memory for such storage must be provided. Second, the memory accesses required to store and retrieve the data can consume large amounts of bandwidth within the computing system.

In order to present a smooth and continuous image on the display, the processing entity processing the video graphics images must maintain a high rate of pixel processing. In order to achieve high rates of pixel processing, pixel data stored in memory must be retrieved, processed, and then stored back in the memory in an efficient manner. Pixel fragments that are received may include a number of samples for a pixel where each sample includes a Z value and a color value. These fragments also include X and Y coordinates that specify, with respect to the display frame, the particular pixel with which the fragment corresponds. In an oversampling system, the Z values of the samples of the fragment are compared with stored Z values of the samples for the particular pixel. If it is determined that samples of fragment are located in front of one or more of the pixel samples (the Z value of the fragment sample indicates less spatial depth), the Z value and color value corresponding to the samples of the fragment that lie in front of the stored samples must be written in the memory that stores the data corresponding to that particular pixel. Typically, the memory storing the pixel information is referred to as the frame buffer.

The memory bandwidth required to fetch the stored sample data and then rewrite the result of any blending operations that combine the fragment with the current pixel state can be substantial. This is even more evident in oversampling systems that store many samples per pixels. The memory bandwidth consumption for these operations can have detrimental effects on other portions of the system that also must access the frame buffer.

One solution is to increase the amount of memory bandwidth available in the system. However, additional memory bandwidth translates into increased cost. This can be due to the requirement for faster, more expensive memories or more memories that can operate in parallel. Parallel memory structures are undesirable as they add complexity to the system and can increase costs of manufacturing 3D graphics processing systems.

Therefore, a need exists for a method and apparatus for reducing the memory bandwidth requirements in a 3D video graphics system that includes anti-aliasing oversampling.

DETAILED DESCRIPTION OF A PREFERRED EMBODIMENT Of THE INVENTION

Figure 1:
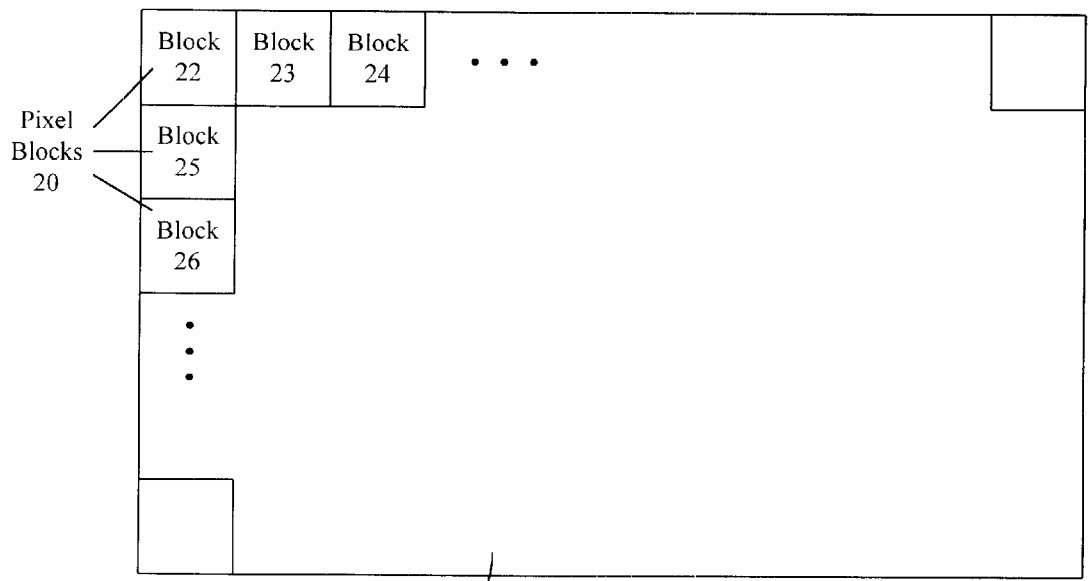
FIG. 1 illustrates a block diagram of a frame divided into a plurality of pixel blocks in accordance with the present invention.

Generally, the present invention provides a method and apparatus for managing compressed Z information in an anti-aliasing video graphics system such that memory bandwidth requirements of the video graphics system are reduced. Each pixel in the display frame is represented with a primary Z value, a secondary Z value, a first and second color, and a pixel mask that indicates how the Z values and colors apply to the samples of the pixel. Some pixels may be adequately represented with a single color value and primary Z value. When the sample set cannot be adequately described using two Z values and colors, a pointer is stored as the secondary Z value for the pixel, where the pointer is used to reference a complete set of samples stored in a sample memory. The primary Z value for sample sets that include pointers store either the front-most or rear-most Z value for the pixel such that some blending operations are still possible without accessing the complete sample set. The pixels in the display frame are grouped into a plurality of pixel blocks, where each pixel block includes a plurality of pixels. The primary Z values for all of the pixels in a pixel block are then compressed using a compression algorithm and stored in a Z buffer in a compressed format. A secondary mask that indicates which pixels in the pixel block have valid secondary Z values is also stored in the Z buffer, along with the secondary Z values in an uncompressed format. A Z mask value for each pixel block in the frame is stored in a Z mask memory, where the Z mask for each pixel block indicates the level of compression of the Z information the corresponding pixel block. When Z information for a pixel block is required for processing operations, a cache is first examined to determine if the Z information for the pixel block is included in the cache. If the Z information is not included in the cache, the Z mask memory is consulted to determine the level of compression of the Z information for the particular pixel block. Based on the indication provided by the Z mask memory as to the level of compression, a predetermined amount of buffered Z information is retrieved from the Z buffer, and when the Z information is in compressed format, it is decompressed. The fetched Z information is then stored in the cache for use in video graphics processing.

By compressing the Z information in the Z buffer when possible, the amount of memory bandwidth required to retrieve the Z information for each pixel block in the frame is reduced. A portion of the compression is achieved by only storing primary Z values for pixels that do not require a pointer or secondary Z value to determine the Z values for each sample in the pixel. Additional compression is achieved by grouping and compressing the primary Z values for the frame. The Z buffer is preferably structured such that each pixel block of the frame is assigned a predetermined amount of memory within the Z buffer such that the location of the information for each pixel block in the Z buffer is always known, and adequate space for storage of uncompressed Z information for each pixel block is provided. Although this is inefficient in terms of usage of memory storage capacity, it improves the speed with which the compressed or uncompressed Z information stored in the Z buffer can be retrieved and stored.

The invention can be better understood with reference to FIGS. 1–7. FIG. 1 illustrates a frame 10 that is divided into a plurality of pixel blocks 20. The pixel blocks 20 shown in FIG. 1 are illustrated as square blocks that, when combined, make up the entire pixel space of the frame 10. It should be noted that the particular shape of the pixel blocks 20 can be modified to suit different compression algorithms used to compress the Z values for the pixels within each of the pixel blocks. Thus, rectangular blocks or other shapes may be appropriate.

Each of the pixel blocks 20 includes a plurality of pixels. The number of pixels included in each pixel block can be selected based on the screen resolution, the compression algorithm utilized to compress the Z information, or the particular application in which the Z information management circuitry is being utilized.

Figure 2:
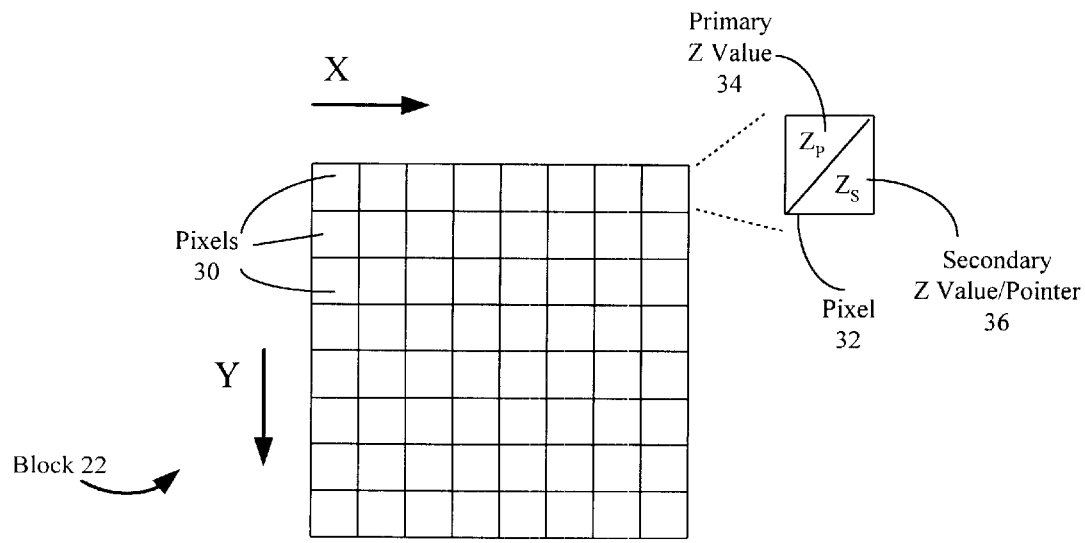
FIG. 2 illustrates a block diagram of a pixel block that includes a plurality of oversampled pixels in accordance with the present invention.

FIG. 2 illustrates a block diagram of one pixel block 22 of the plurality of pixel blocks 20 that makes up the frame. The block 22 is shown to include a plurality of pixels 30. The block 22 as illustrated in FIG. 2 is shown to include 64 pixels, arranged in an 8-by-8 grid. The X and Y directions are shown for reference. Although the number of pixels within a pixel block can vary, the pixel block 22 that includes 64 pixels will be used as an example pixel block for illustrative purposes. An 8-by-8 pixel block is preferable because, in many cases, a block of this size will be completely contained with a single graphics primitive. Better compression results are typically achieved when the entire block being compressed is within a single primitive.

In a video graphics system that employs oversampling, each pixel in the system is described by a number of samples. These samples are combined to produce a resultant color value for the particular pixel. In the preferred embodiment, each pixel is described by eight samples, but any number of samples can be used. It should be understood that there is a tradeoff between the accuracy achieved with additional samples and the costs of processing and storing those additional samples.

Each sample consists of a color value and a Z value. The Z value of a sample determines where the sample is positioned depth-wise in relation to other samples. This allows for one shape or image to be spatially positioned in front of another. Z values are preferably represented with 16-bits, but it is understood that other bit quantities may be used to describe the depth of a particular pixel. Similarly, it is preferable that each color is represented by a 16-bit value. It should be obvious that more or fewer colors may be represented by using a different number of bits. The complete set of samples that describes a particular pixel is a pixel sample set.

A first level of compression is achieved in the system by attempting to represent each pixel with a compressed sample set. The technique for performing this portion of the compression was disclosed and described in additional detail in patent application Ser. No. 09/141,797 entitled "METHOD AND APPARATUS FOR VIDEO GRAPHICS ANTI-ALIASING" which was filed on Aug. 28, 1998. Preferably, the compressed sample set consists of two color and Z value pairs and a pixel mask that determines which samples of the set use each color/Z value combination. For example, if a pixel has the edge of a shape passing through it, samples describing the pixel will either be in the area covered by the shape (having a first color and primary Z) or in the area where the background is exposed (having a second color and secondary Z). The method realizes that this situation arises often, and that it is wasteful to store all of the samples when there are really only two different color and Z values. Therefore, when it is possible, instead of storing all eight samples, each having a color and Z value, the method compresses the eight samples to two samples (two color and Z values) and a pixel mask that describes which of the eight normally stored samples are covered by each the two stored samples.

Continuing with the example, if the shape covers samples 0, 3, and 4 of the pixel, the pixel mask may have the binary representation 00011001. In this pixel mask, the binary number 0 corresponds to samples that have the background color and Z values, while a value of 1 corresponds to samples having the color and Z values of the shape. It should be apparent that these can be interchanged and the pixel mask inverted. Thus, if two or fewer color and Z values can represent all of the samples of the pixel sample set, the sample set can be compressed to a compressed sample set that includes the color and Z values along with a pixel mask.

If it is determined that the sample set for a pixel cannot be reduced to a compressed sample set, a Z value that represents the entire pixel is stored as the primary Z value for the pixel, and a pointer is stored as the secondary Z value. The pointer references a sample memory that stores the entire sample set for the pixel. Preferably, the sample memory can store a plurality of such sample sets. The sample memory may include non-local memory, such as main memory that is accessed through a bus. In one embodiment, the primary Z value for these types of pixels stores the front-most Z value of the samples stored in the sample memory. This allows for some blending determinations to be made without accessing the complete sample set. A similar result is achieved by storing the rear-most Z value of the samples as the primary Z value.

The pixel 32 of FIG. 2 shows that each pixel includes a primary Z value ($Z_p$) and a secondary Z value ($Z_s$). In some cases, the pixel will be completely covered by a single primitive and one primary Z value and one color will be adequate to describe the complete sample set for the pixel. In such cases, some compression is achieved by only storing the primary Z value and an indication that the second Z value is not valid or not present. The pixel mask that describes the coverage of the pixel by the two color and Z values can be used to determine whether a valid secondary Z value or pointer is necessary and therefore included for each pixel.

The pixel mask for a compressed sample set will be a mixture of binary 1's and 0's if the pixel is covered by samples having two color and Z values. If the pixel can be fully described by a single color and Z value (i.e. the entire pixel is covered by a single primitive), this can be indicated in two different ways. In the first case, the mask can be set to all 1's, and the color and Z are stored in the color and Z locations that correspond to the mask value of 1. In the second case, the mask can be set to all 0's, and the color and Z stored in the color and Z locations that correspond to the mask value of 0. Both of these options produce identical results.

Preferably, one of the two options described above is used exclusively for single-color pixels, and the other is set aside to indicate that the storage space in the primary memory is being used to store a pointer rather than a compressed sample set. For example, if the mask contains all 0's, the pixel is assumed to be solid (covered by a single color/Z) and the primary Z value and first color fully describe the pixel sample set. If the mask contains all 1's, this indicates that a pointer is stored in the secondary Z location. A mix of 0's and 1's indicates that there is a valid secondary Z for the pixel as the pixel is described with two color/Z pairs.

Figure 3:
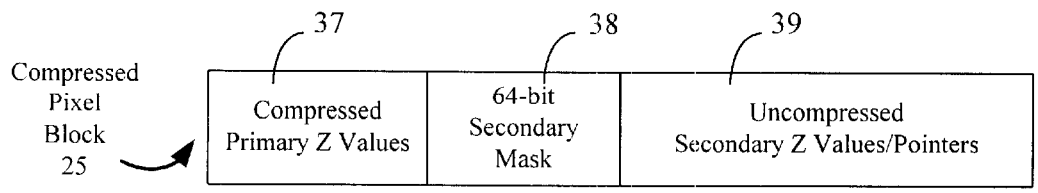
FIG. 3 illustrates a block diagram of a storage format for Z information for a compressed pixel block in accordance with the present invention.

FIG. 3 illustrates a block diagram of a compressed pixel block 25 as it may be stored in the Z buffer. It should be apparent to one of ordinary skill in the art that the portions may be reordered or rearranged to suit the needs of the system. The first section 37 stores the compressed primary Z values for the pixel block. Because each pixel will have a valid primary Z value, these values can be compressed using a variety of compression algorithms to reduce the space required to store them. A particularly appropriate compression algorithm is described in a co-pending patent application having a serial number XXX, entitled "METHOD AND APPARATUS FOR COMPRESSING PARAMETER VALUES FOR PIXELS IN A DISPLAY FRAME", having an attorney docket number of 0100.9900770 and a filing date of XXX.

The second field 38 of the compressed pixel block 25 stores a secondary mask that indicates which of the pixels in the pixel block have valid secondary Z values. A valid secondary Z value indicates that either a secondary Z value corresponding to a second color is included in the Z buffer or that a pointer is stored in the Z buffer that will allow the complete sample set for the pixel to be accessed. The presence of either of a pointer or secondary Z can be indicated for each pixel with a single bit such that if the bit is in one state, no secondary Z or pointer is stored for the pixel, while the other state indicates that a secondary Z or pointer is included for that pixel in the compressed pixel block. Thus, for an 8-by-8 pixel block, 64 bits would be required to indicate the presence/absence of secondary Z values and pointers for all of the 64 pixels in the block. Preferably, these bits are ordered corresponding to the pixel in the block such that matching the bit to the pixel is a simple task.

The third field 39 of the compressed pixel block 25 stores the secondary Z values and pointers for those pixels for which these values are required. Preferably, these values are stored in an uncompressed format in an order that corresponds to the secondary mask. When a secondary Z value is stored, the pixel mask is stored along with the secondary Z value such that the coverage of the samples by the first and second Z values and colors is also stored in the Z buffer. Thus, the Z values for the pixel block can be recovered from the compressed pixel block 25 by uncompressing the primary Z values and then combining the uncompressed primary Z values with any secondary Z values and pointers as indicated by the secondary mask.

Figure 4:
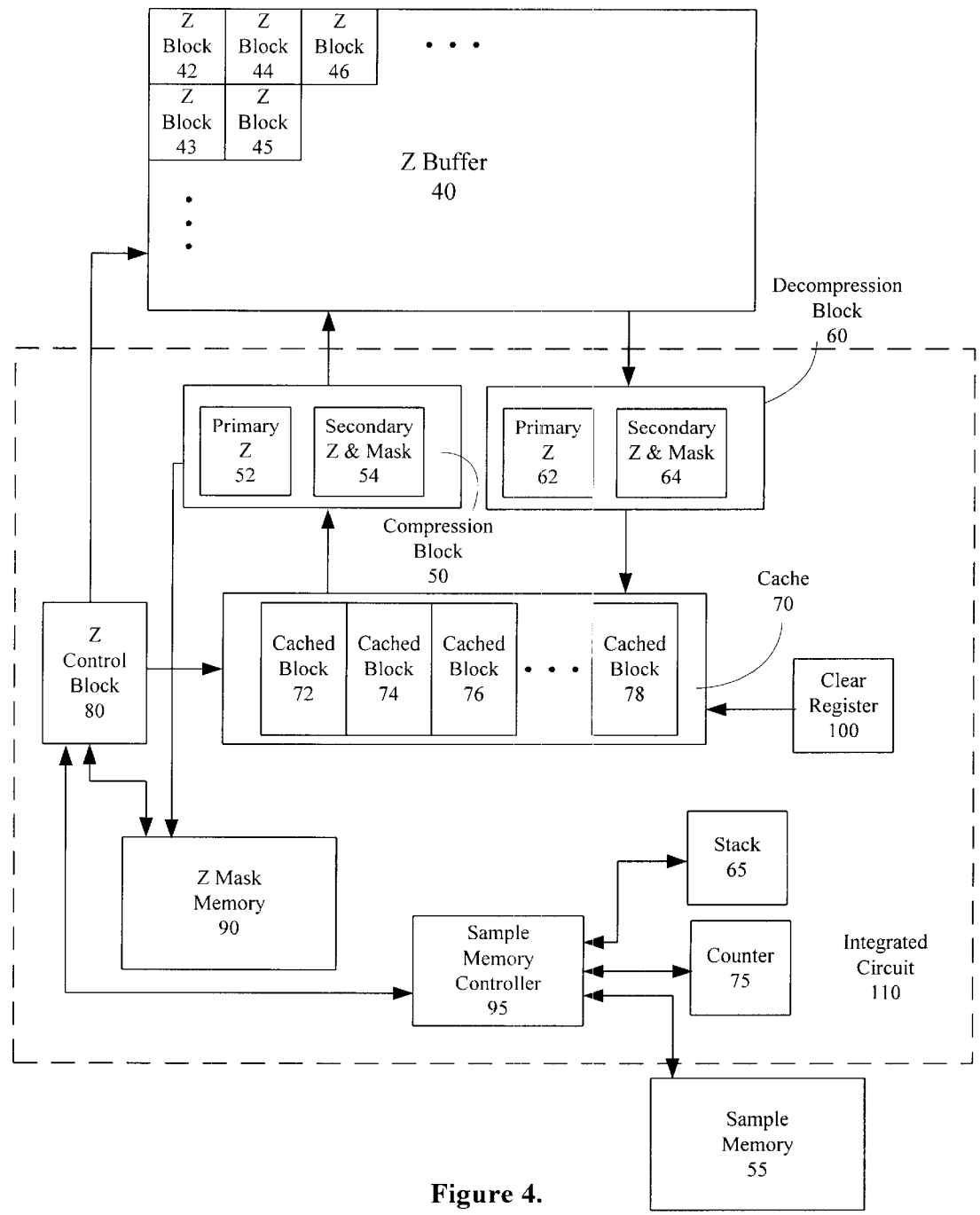
FIG. 4 illustrates a block diagram of a circuit for processing Z information in accordance with the present invention.

FIG. 4 illustrates a block diagram of a circuit for processing Z information that is preferably included in a video graphics circuit that may be implemented on a video graphics card for use in a personal computer. The circuit of FIG. 4 includes a cache 70, a Z mask memory 90, a Z buffer 40, a Z control block 80, a decompression block 60, a sample memory controller 95, a sample memory 55, and preferably a compression block 50.

The cache 70 stores Z information corresponding to a cached set of pixel blocks of the frame. The cache 70 includes cached blocks 72–78, where each cached block includes Z information in an uncompressed format corresponding to one of the plurality of pixel blocks 20 of the frame 10. Preferably, the cache 70 includes enough storage space to store N pixel blocks where N is a number. The number N may be determined based on the number of pixel blocks included in the frame, or the die area or circuitry available for implementation of the cache 70. In one embodiment, the value of N is ten such that ten pixel blocks are stored in uncompressed format in the cache.

The Z values for each pixel block in the cache are stored in a cached format, where the cached format for each pixel includes the primary Z value, a secondary Z value, and the pixel mask for each pixel. If a pixel is filly described with the primary Z value, the secondary Z value is invalid, but a placeholder is preferably stored such that indexing through the pixel block in the cache to reach a particular set of pixel values is simplified.

The Z mask memory 90 stores a Z mask value for each of the plurality of pixel blocks of the frame. Preferably, the Z mask memory is a lookup table that stores the compression level for each of the pixel blocks. Each Z mask value indicates a level of compression of the Z information for a corresponding pixel block, which allows the amount of data to be fetched from the Z buffer for any pixel block to be accurately deteremined. The Z buffer 40 stores buffered Z information for each pixel block of the frame 10. As described earlier, the buffered Z information is preferably stored in a compressed format when possible.

The Z control block 80 is operably coupled to the cache 70, the Z buffer 40, and the Z mask memory 90. The Z control block 80 receives coordinates corresponding to a selected pixel in the frame and determines if Z information for that selected pixel is currently included in one of the cached blocks 72–78 currently stored in the cache 70. The Z control block 80 typically receives a request for the Z information for a particular pixel from a backend rendering block or some other block that processes pixel data. If the pixel block that includes the pixel for which the coordinates have been received is one of the cached blocks 72–78, the Z information for that pixel can be retrieved directly from the cache and utilized by the requesting entity.

However, if the pixel is not included in one of the pixel blocks for which Z information is currently stored in the cache 70, the Z information for that particular block is retrieved and placed in the cache 70. This is accomplished by reading the Z mask value from the Z mask memory 90 that corresponds to the pixel block that includes the selected pixel. The Z mask indicates the level of compression of the Z information in the Z buffer 40 for the selected pixel block that includes the selected pixel. Based on this, the Z control block 80 can read the appropriate amount of buffered Z information from the location corresponding to the selected pixel block in the Z buffer 40.

The information read from the Z buffer 40 is then provided to the decompression block 60. When the buffered Z information is stored in a compressed format, which is indicated by the mask value read from the Z mask memory 90, the decompression block 60 decompresses the buffered Z information prior to storing it in one of the cache blocks 72–78. Preferably, the decompression block 60 includes a primary Z decompression block 62 and a secondary Z and mask decompression block 64. The primary Z decompression block performs the decompression of the primary Z values for the pixel block. The decompression of the primary Z values is accomplished by reversing the compression algorithm used to compresses these values. The secondary Z and mask decompression block 64 utilizes the secondary mask stored for the pixel block in the Z buffer 40 to determine to which pixels any included secondary Z values apply. The decompression block organizes the primary Z values, pixel masks, secondary Z values (which may include pointers) in the cached format for storage in the cache 70.

When the decompression block 60 overwrites a cached block that has been altered since it was read from the Z buffer 40, the block within which this altered data has been stored will be flushed from the cache and re-compressed via the compression block 50 prior to being stored in the Z buffer 40. The compression block 50 will store a new compression level for the particular block in the Z mask memory 90. Preferably, the compression block 50 includes a primary Z compression block 52 and a secondary Z and mask compression block 54. The primary Z compression block 52 compresses the primary Z values for the pixel block using a compression algorithm, while the secondary Z and mask compression block 54 generates a secondary mask for the pixel block and organizes the secondary Z values and pixel masks such that decompression of the block is straightforward. An example below will further clarify the functionality of the compression block 50.

The sample memory controller 95 is used to manage those pixels whose samples cannot be fully represented with two color and Z values. The sample memory controller may be a discrete controller or may be integrated with the Z control block to form a single overall control block. If the Z information for a cached pixel includes a pixel mask that indicates that a pointer is in the secondary Z value location, this pointer is relayed to the sample memory controller 95 which can retrieve the complete sample set for the pixel from the sample memory 55.

When the information for a pixel is to be stored in memory and the Z and color information for the samples of the pixel require more than two color and Z values, an entry is created in the multi-sample array of the sample memory 55 to store the sample set for the pixel. The counter 75 stores the location of the next free element in the sample memory 55. When the next element counter 75 is read for use, the next element counter 75 increments such that it continually points tot he next free element of the sample memory 55. The stack 65 stores released locations, where a released location is an entry of the multi-sample array which was used at one time to store samples, but is no longer in use and can be re-used. When storing a new multi-sample set in the sample memory 55, the sample memory controller 95 first checks the stack 65 for released entries. If there is a released entry, it is popped off of the stack 65 and used. If there is not a released entry available in the stack 65, the next free element counter 75 is read to determine the entry to use to store the multi-sample set for the pixel. The samples for the pixel are then stored in the sample memory 55 and the pointer to the entry is included with the compressed sample set for the pixel that includes the pixel mask indicating a pointer is included in the compressed sample set.

An example which illustrates the functionality of the circuitry of FIG. 4 begins with the cache memory 70 storing cached Z information corresponding to pixel blocks 22, 23, 24, and 25 of FIG. 1. If the Z control block 80 receives coordinates corresponding to a pixel in any one of the blocks 22–25, the information is present within the cache 70 and can simply be read and utilized. If the pixel mask for the pixel indicates that a pointer is stored as the secondary Z value for the pixel, the sample memory controller 95 will be used to fetch the complete sample set for the pixel from the sample memory 55.

If the Z control block receives pixel coordinates corresponding to a pixel located within pixel block 26 of FIG. 1, this pixel information is not currently included in the one of the cached block 72–78 of the cache 70. At this point, the Z control block 80 will reference the Z mask memory 90 to ascertain the level of compression of the Z information in the Z buffer 40 corresponding to the pixel block 26. Assuming that the Z blocks 42–46 stored in the Z buffer 40 correspond to the pixel blocks 22–26, respectively, the Z mask corresponding to pixel block 26 will indicate the level of compression of the Z information included in the Z block 46 stored in the Z buffer 40.

The various levels of compression can be indicated in a number of ways. Preferably, an M bit value encodes $2^M$ potential compression levels. Thus, if two bits are included in each Z mask, four different levels of compression can be encoded in each Z mask. The table below illustrates three different potential compression level encodings.

| ENCODING BITS | COMPRESSION LEVEL | | |
|---|---|---|---|
| 00 | 128 | 256 | Clear |
| 01 | 256 | 512 | 512 |
| 10 | At least 384 | 1024 | 768 |
| 11 | Uncompressed | Uncompressed | Uncompressed |

The first encoding scheme would most likely be used in a memory system that fetches 128-bit blocks from the Z buffer 40. Thus, if the Z mask stored a 00, only one block would need to be fetched. If a 01 was encoded, two blocks would be fetched. If a 10 was stored in the Z mask, at least three blocks would be fetched, and preferably those three blocks would store an additional indication as to how much additional data must be fetched for that particular Z block. The level encoded with the value 11 indicates that the Z data for that particular block is uncompressed, and no decompression would be required. When the Z data is uncompressed, the data contained in the entire section of memory dedicated that that particular block in the Z buffer would have to be fetched and stored in the cache. Note that the numbers included in the table are merely example numbers for illustrative purposes.

The second encoding scheme is similar to the first, but the granularity of fetching is 256 bits rather than 128 bits. It may be that in this particular Z buffer the minimum block fetch is 256 bits. Note that the minimum block fetch is typically going to affect the different levels of compression that the Z masks will encode. This, however, is not a requirement.

The final encoding scheme in the right-most column shows that an encoding value of 00 indicates that the Z values for that particular pixel block are cleared Z values. A cleared Z value indicates that any fragment corresponding to that pixel will overlay whatever is there and the Z value of the fragment should be stored in place of the cleared value. When this is indicated, rather than fetching an array of cleared values from the Z buffer 40, a clear register 100 may be utilized by the cache 70 to load a cached block with a set of clear values. Thus, a clear value will be stored in the cache as the Z value corresponding to each of the plurality of pixels in the pixel block to which the Z mask corresponds. Note that the encoding levels 01, 10, and 11 are similar to the other encoding schemes in that the granularity of compression is based on a 256-bit block, but the minimal fetch is two 256-bit blocks. Thus, an encoding of 10 will fetch three blocks, and an encoding of 11 will fetch the entire block of data stored in the Z buffer 40.

Continuing with the example, if the Z information for the pixel block 26 that has been read from the Z buffer 40 is to be stored in the cached block 72, the current contents of the cached block 72 must be stored back into the Z buffer 40. This assumes that the information within the cached block 72 has been altered in some way since it was read from the Z buffer 40. Determining whether or not the data has been modified can be accomplished by using a dirty bit for each block entry in the cache 70. Thus, if data stored in the cache block 72 has been altered since it was loaded in the cache 70, the dirty bit will be set. When the information in the cache block 72 is flushed to make room for data being read from the Z buffer 40, the dirty bit will be examined to determine whether or not the data must be written back to the Z buffer 40. If the dirty bit is clear, the data has not been modified and the copy of the data stored in the Z buffer is current and does not need to be replaced.

If the dirty bit is set, the information stored in the cached block 72 will be provided to the compression block 50 which will attempt to compress the Z information. Assuming that the data can be compressed, the compression block 50 will store the compressed set of Z information in the correct entry within the Z buffer 40, where the correct entry corresponds to the particular pixel block to which the Z information corresponds. The compression block 50 will also update the Z mask for that pixel block in the Z mask memory 90 to reflect the current level of compression of the buffered Z information for the pixel block.

The compression block 50 may have a threshold that it used to judge its attempts to compress Z information. If the compression block 50 cannot compress a cached block to the point that it exceeds this compression threshold, it will not compress the block at all. In those cases, it will store the block in uncompressed format in the Z buffer 40. Such a compression threshold can be used to ensure that the overhead associated with compressing and decompressing the data does not exceed the overhead of simply storing and retrieving the data in uncompressed format.

Once again, it should be noted that the Z buffer 40 is preferably divided into a plurality of Z blocks, where each Z block is capable of storing the Z information for a particular pixel block in uncompressed format. Thus, each pixel block of the frame 10 has an associated area of memory in the Z buffer 40 for storage of its Z information. The blocks are sized to suit the worst case condition where no compression is possible. When compression is possible, only a portion of the memory space for the particular pixel block will be utilized. Although somewhat wasteful of storage capacity, the assignment of particular areas of memory to each of the pixel blocks provides the advantage of always knowing where the Z information for a particular pixel block is located. An additional advantage is the guarantee that if a compressed set of Z information is modified so it can no longer be compressed to the same degree, there will still be adequate space assigned to that particular pixel block to store the uncompressed, or less-well-compressed, Z information. In addition to these advantages, the variable compression levels provided by the system could create a large amount of overhead in terms of management if the storage space for particular pixel blocks in the memory varied in terms of size or location.

As stated earlier, the circuit of FIG. 4 is preferably included in a video graphics circuit that may be included on a video graphics card for use in a personal computer. More preferably, all of the components of the circuit of FIG. 3 other than the Z buffer 40 and the sample memory 55 are preferably implemented on a single integrated circuit 110. The implementation of these circuit elements on an integrated circuit allows for more efficient interaction between the various circuit components and reduces costs of the video graphics card as the number of components on the card is reduced. Although current technology makes it possible to include the Z buffer 40 and the sample memory in the integrated circuit, it may not be economically feasible due to the additional die area, testing, and potential for defects that the addition of these memory structures adds. However, as integrated circuit processing and design techniques are further advanced, it may become more practical to include the Z buffer 40 and/or the sample memory 55 in the integrated circuit 110.

Figure 5:
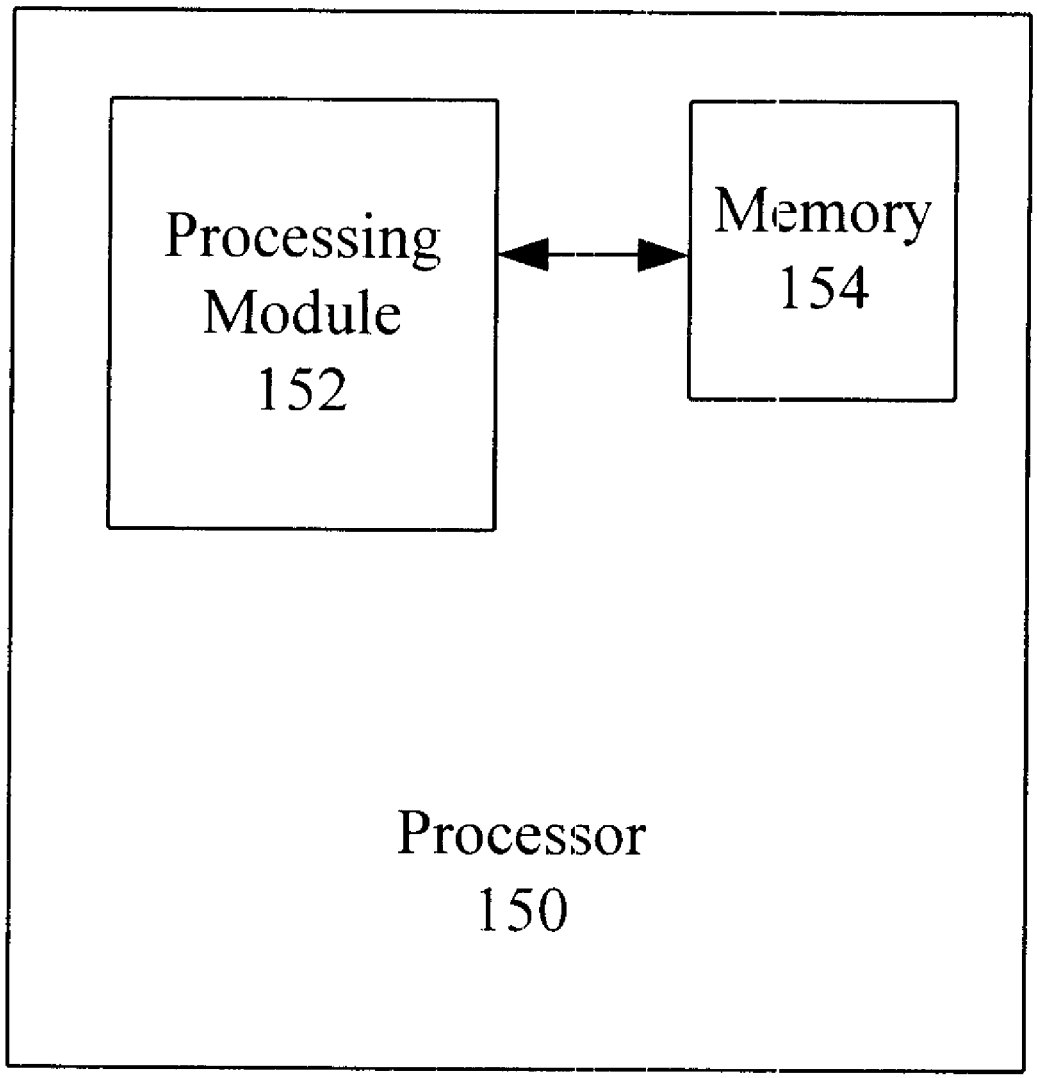
FIG. 5 illustrates a block diagram of a processor for managing compressed Z information in accordance with the present invention.

FIG. 5 illustrates a processor 150 that may be used for managing compressed Z information in a video graphics circuit. The processor 150 includes a processing module 152 and memory 154. The processing module may include a single processing entity or a plurality of processing entities. Such a processing entity may be a microprocessor, microcontroller, digital signal processor, state machine, logic circuitry, and/or any device that processes information based on operational and/or programming instructions. The memory 154 may be a single memory device or a plurality of memory devices. Such a memory device may be a read only memory device, random access memory device, floppy disk, hard drive memory, and/or any device that stores digital information. Note that when the processing module 152 has one or more of its functions performed by a state machine and/or logic circuitry, the memory containing the corresponding operational instructions is embedded within the state machine and/or logic circuitry.

Figure 6:
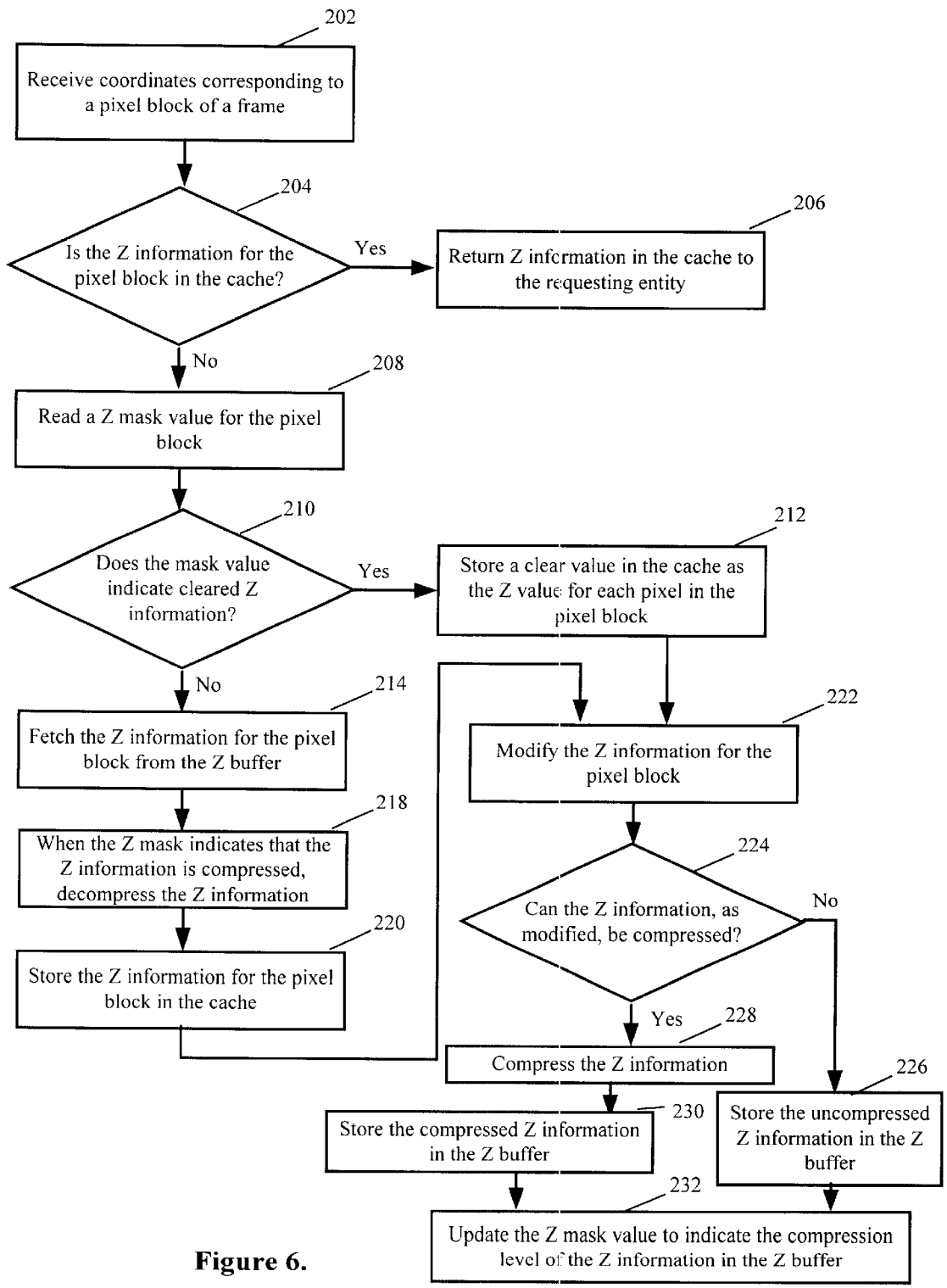
FIG. 6 illustrates a flow diagram of a method for controlling compressed Z information in accordance with the present invention.

The memory 154 stores programming and/or operational instructions that, when executed, allow the processing module 152 to perform the method illustrated in FIG. 6. Note that the processor 150 may implement some of the functions of FIG. 6 through software stored in the memory 154, whereas other portions maybe implemented using hardware, or circuitry included within the processor 150. Thus, in some embodiments, a mix of hardware and software may be used to perform the method illustrated in FIG. 6.

FIG. 6 illustrates a method for controlling, or managing, compressed Z information in a video graphics system that includes anti-aliasing oversampling of the pixels of the display frame. The method begins a step 202 where coordinates corresponding to a pixel block of a frame are received. The coordinates may correspond to a single pixel, where the pixel block to which the coordinates correspond is determined based on which pixel block includes the identified pixel. Each pixel in the frame is oversampled for anti-aliasing purposes, and each sample includes color and Z information for a portion of the pixel. As before, the frame includes a plurality of pixel blocks, and each pixel block of the plurality of pixel blocks includes Z information for a plurality of pixels. The Z information for each pixel represents the spatial depth of the pixel with respect to the display.

At step 204, it is determined whether or not the Z information for the pixel block is currently present in a cache. If it is determined at step 204 that the Z information for the particular pixel block is in the cache, the method proceeds to step 206, where the Z information in the cache can be returned to the requesting entity for use. If the Z information includes a pointer to a sample memory, a sample memory controller can fetch the complete sample set for the pixel from a sample memory. If it is determined at step 204 that the Z information for the pixel block is not included in the cache, the method proceeds to step 208.

At step 208, a Z mask value for the pixel block is read from a Z mask memory that stores Z mask values for the plurality of pixel blocks that make up the frame. At step 210, it is determined whether or not the Z mask indicates that the Z information for the pixel block is cleared Z information. If it is determined at step 210 that the Z information for the pixel block is cleared Z information, the method proceeds to step 212 where a clear value is stored in the cache as the Z value for each pixel in the pixel block. If the determination at step 210 shows that the Z information for the pixel block is not cleared Z information, the method proceeds to step 214.

At step 214, the Z information for the pixel block is fetched from the Z buffer. The Z mask value read at step 208 indicates a level of compression of the Z information for the pixel block in the Z buffer. Knowing the level of compression of the Z information allows the Z information to be fetched from the Z buffer in an efficient manner. Thus, if the Z information for the particular pixel block has been compressed to a significant degree, much less memory bandwidth will be required to fetch the Z information for the pixel block.

At step 218, when the Z mask value indicates that the Z information for the pixel block is stored in the Z buffer in a compressed format, the compressed Z information is decompressed to produce uncompressed Z information. Preferably each pixel has a primary and secondary Z value and a pixel mask as described with respect to FIG. 2. The secondary Z value may be invalid, may store a pointer to the sample memory, or may be a valid second Z value that corresponds to a portion of the samples for the pixel. Preferably, the compression algorithm used to compress the Z information for storage in the Z buffer compresses primary Z values for each pixel block independently of the secondary Z values and pixel masks for the pixels. More preferably, the compressed Z information for each pixel block is structured as was described with respect to FIG. 3 such that the secondary Z values and pixel masks for those pixels that require them are easily recoverable from the compressed pixel block. Decompression preferably reconstructs the primary Z values, secondary Z values and pixel masks for the pixel blocks into a cache format that allows for simple pixel-by-pixel indexing through the decompressed pixel block information in the cache.

At step 220, the Z information for the pixel block is stored in uncompressed format in the cache. The uncompressed Z information stored in the cache can then be utilized by the requesting entity to perform whatever video graphics processing for which the Z information was required. Once again, if the Z information for a particular pixel in the cache has a secondary Z value that is a pointer, which is preferably indicated by the pixel mask for the pixel, the full sample set for the pixel can be retrieved from the sample memory using the pointer.

The method of FIG. 6 preferably includes steps 222–232 that correspond to modification and storage of Z information included in the cache. At step 222, Z information for the pixel block stored in the cache is modified. The modification may be the result of video graphics processing operations. When space within the cache is needed for the Z information corresponding to a different pixel block, at least a portion of the cache must be flushed and the Z information currently stored in the flushed location may have to be stored back into the Z buffer. When the Z information corresponding to at least one of the plurality of pixels included in the pixel block has been modified, the information in the Z buffer must be updated. If no modification has occurred, there is no need to overwrite the Z information for the pixel block currently stored in the Z buffer.

Assuming that the Z information in the Z buffer for the pixel block must be updated, at step 224, it is determined whether or not the Z information being flushed from the cache can be compressed. This comparison preferably determines whether or not the Z information can be compressed to a level that exceeds a compression threshold. Preferably, the compression threshold determines the point at which compression of the Z information reduces the overall overhead required to maintain the Z information for that particular pixel block.

If it is determined that the Z information cannot be efficiently compressed at step 224, the method proceeds to step 226 where the Z information is stored in uncompressed format in the Z buffer. If it is determined at step 224 that the Z information can be efficiently compressed, the method proceeds to step 228 where the Z information is compressed. The compression performed at step 228 may be performed using a variety of compression techniques that are well known in the art. These techniques take advantage of regularity or consistency within the set of primary Z values for a particular pixel block, and allow the information to be compressed in a lossless manner that results in fewer bits being required to store the primary Z information for the entire pixel block. Additional compression is achieved by only storing valid secondary Z values, including pointers, and indicating which pixels have valid secondary Z values using a secondary mask as described earlier. Therefore, the compression step 228 includes determining which pixels have valid secondary Z values, constructing a revised secondary mask to identify such pixels, compressing the primary Z information for the block, and organizing the different portions of the compressed pixel block, which may include combining the portions as illustrated in FIG. 3. At step 230, the compressed Z information is stored in the Z buffer.

At step 232, the Z mask corresponding to the pixel block is updated. The Z mask is updated to reflect the current compression level for the Z information for that particular pixel block in the Z buffer. As was described with respect to FIG. 4, the Z masks for each of the pixel blocks may be made up of one or more bits, where the bits encode the level of compression. Preferably, enough bits are used to allow for a variety of different compression levels. More preferably, two bits are used to encode four levels of compression, and one of the four levels of compression indicates that no compression of the Z information has occurred.

Figure 7:
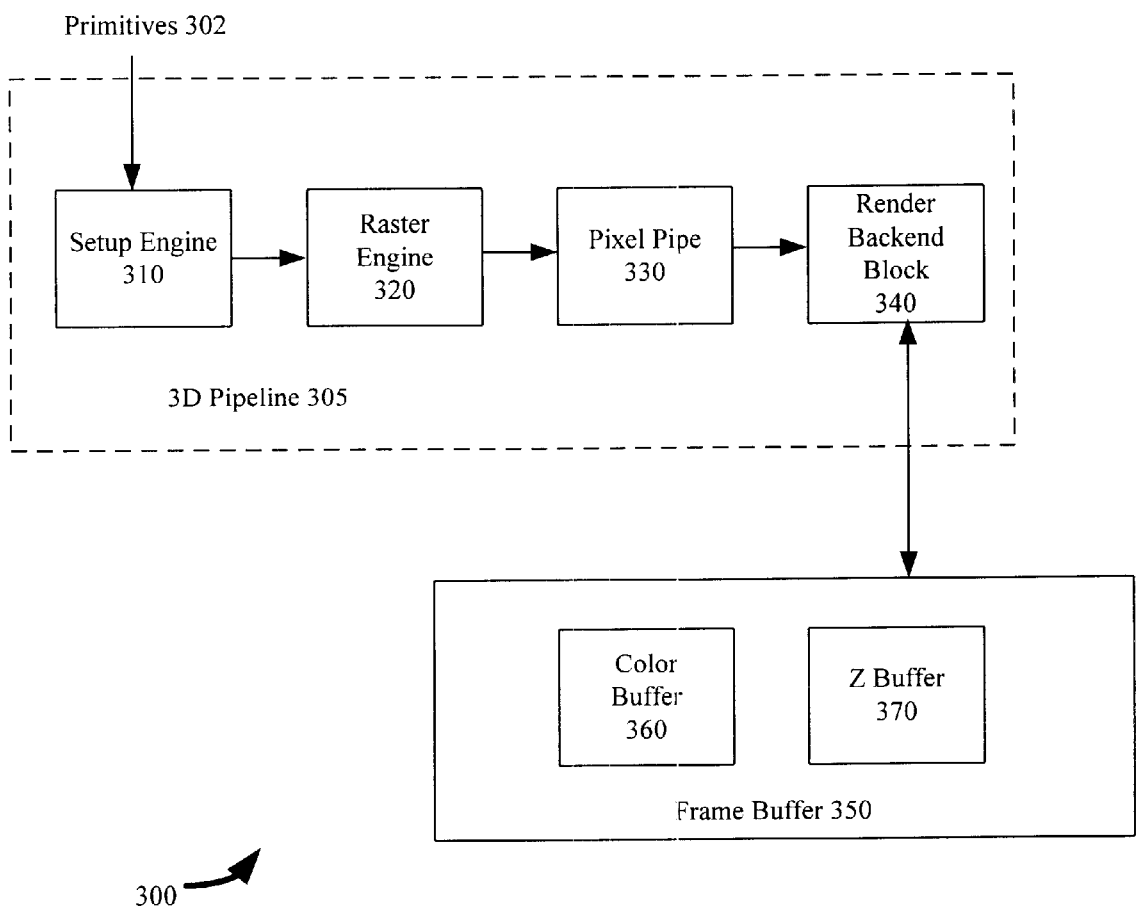
FIG. 7 illustrates a block diagram of a video graphics circuit in accordance with the present invention.

FIG. 7 illustrates a circuit 300 that includes a 3D pipeline 305 operably coupled to a frame buffer 350. The 3D pipeline 305 preferably includes a set-up engine 310, a raster engine 320, a pixel pipe 330, and a render backend block 340. The frame buffer 350 preferably includes a color buffer 360 that stores color information corresponding to pixels in a display frame, and a Z buffer 370 that stores corresponding Z values for the pixels included in the display frame. Preferably, the interface between the render backend block 340 and the Z buffer 370 includes the circuitry illustrated in FIG. 4, or utilizes the method illustrated in FIG. 6 such that Z information for oversampled pixels in the frame can be stored in a compressed format that reduces the overall memory bandwidth required to access Z information for the oversampled pixels.

Preferably, the 3D pipeline 305 is included in a video graphics integrated circuit that may also include two-dimensional graphics processing and other processing blocks that may effect the data stored within the frame buffer 350. Such an integrated circuit is preferably capable of, among other things, rendering three-dimensional video graphics images for display. More preferably, the interface circuitry between the render backend block 340 and any other blocks on the integrated circuit that require access to the Z information stored in the Z buffer 370 are coupled to the circuitry, or entity employing the methodology of the invention described herein such that the Z information in the Z buffer 370 can be stored in a compressed format.

The set-up engine 310 produces primitive slope information based on received graphics primitives 302. Preferably, the graphics primitives 302 are triangle primitives, which are commonly used in video graphics applications. Slope information corresponding to these primitives is provided to the raster engine 320, which is operably coupled to the set-up engine 310. The raster engine 320 generates pixel fragments from the primitive slope information. Preferably, each pixel fragment includes a coverage mask that indicates pixel sample coverage of the fragment, a fragment color value, a set of coordinates indicating a pixel in the display frame to which the fragment corresponds, and a Z value for the fragment.

The raster engine 320 provides the pixel fragments to the pixel pipe 330, which is operably coupled to the raster engine 320. The pixel pipe 330 performs various operations that may modify the color of the pixel fragment as received from the raster engine 320. Such operations can include texture-mapping operations. The textured fragment resulting from the operations performed by the pixel pipe 330 are then passed to the render backend block 340 which is operably coupled to the pixel pipe 330 and the frame buffer 350.

The render backend block 350 blends textured fragments with corresponding pixels in the frame buffer 350 as determined by the set of coordinates for each textured fragment. The Z value for each textured fragment is used to blend the fragment with the currently stored pixel information. The retrieval of the Z values for each sample of the currently stored pixel information is preferably accomplished based on the circuitry of FIG. 4, or the methodology of FIG. 6.

The blending operations performed by the render backend block 340 are well known in the art, and the resulting pixel information produced by the render backend block 340 is stored back in the frame buffer 350. The frame buffer 350 can be accessed by display hardware to retrieve the pixel information for use in generating the display.

By compressing the Z information for a plurality of pixel blocks that make up a display frame, the memory bandwidth required to both fetch and store the Z information for the pixel blocks can be greatly reduced. This allows for faster processing of the video graphics pixels making up the frame, allowing for better overall performance of the video graphics circuitry.

It should be understood that the implementation of variations and modifications of the invention in its various aspects should be apparent to those of ordinary skill in the art, and that the invention is not limited to the specific embodiments described. It is therefore contemplated to cover by the present invention, any and all modifications, variations, or equivalents that fall within the spirit and scope of the basic underlying principles disclosed and claimed herein.

What is claimed is:

1. A method for controlling compressed Z information, comprising:

receiving coordinates corresponding to a pixel block of a frame, wherein the frame includes a plurality of pixel blocks, wherein each pixel block of the plurality of pixel blocks includes Z information for a plurality of pixels, wherein Z information for each pixel represents spatial depth of the pixel;

determining if Z information for the pixel block is present in a cache;

when the Z information for the pixel block is not present in the cache:

reading a Z mask value for the pixel block;

fetching the Z information for the pixel block from a Z buffer, wherein the Z mask value for the pixel block indicates a level of compression of the Z information for the pixel block in the Z buffer, wherein the Z information for the pixel block includes a primary Z value for each pixel in the pixel block, a secondary Z value for each pixel of the pixel block for which the primary Z value does not provide adequate Z coverage, a pixel mask that indicates sample coverage for each pixel of the pixel block, and a secondary mask indicating which pixels within the pixel block have secondary Z values;

when the Z mask value indicates the Z information for the pixel block is compressed, decompressing the Z information; and storing the Z information for the pixel block in the cache.

2. The method of claim 1, wherein reading the Z mask value further comprises:

when the Z mask value for the pixel block indicates that the Z information for the pixel block is cleared Z information, storing a clear value in the cache as the Z value corresponding to each of the plurality of pixels.

3. The method of claim 1, wherein storing the Z information for the pixel block in the cache further comprises:

storing the Z information in a cache format, wherein the cache format includes a first Z value, a second Z value, and the pixel mask for each pixel of the pixel block, wherein the primary Z value for each pixel is stored as the first Z value of the cache format, wherein when a secondary Z value for a pixel is included in the Z information read from the Z buffer, the secondary Z value is stored as the second Z value for the pixel in the cache.

4. The method of claim 1 further comprises:

modifying Z information stored in the cache corresponding to at least one of the plurality of pixels in the pixel block;

determining pixels in the pixel block that have valid secondary Z values stored in the cache;

constructing a revised secondary mask for the pixel block, wherein the revised secondary mask indicates which pixels within the pixel block have valid secondary Z values;

compressing the primary Z values for the plurality of pixels in the pixel block to produce compressed primary Z information;

storing the compressed primary Z information, the revised secondary mask, the valid secondary Z values, and the pixel masks for the plurality of pixels of the pixel block in the Z buffer at a location corresponding to the pixel block; and updating the Z mask value to indicate compression level of the compressed Z information.

5. The method of claim 4, wherein compressing the primary Z values further comprises compressing the primary Z values when the primary Z values can be compressed to a level that exceeds a compression threshold.

6. The method of claim 1, wherein reading the Z mask value further comprises reading the Z mask value from a Z mask memory, wherein the Z mask memory stores a corresponding Z mask value for each pixel block of the frame.

7. The method of claim 6, wherein each Z mask value includes a plurality of bits, wherein the plurality of bit codes the level of compression.

8. The method of claim 7, wherein the plurality of bits further comprises two bits, wherein encoded states of the two bits indicate four levels of compression.

9. A circuit for processing Z information, comprising:

a cache storing Z information corresponding a cached set of pixel blocks of a frame, wherein the frame includes a plurality of pixel blocks, wherein each pixel block of the plurality of pixel blocks includes a plurality of pixels, wherein Z information for each pixel represents spatial depth of the pixel;

a Z mask memory storing a Z mask value for each of the plurality of pixel blocks of the frame, wherein each Z mask value indicates a level of compression for a corresponding pixel block;

a Z buffer that stores buffered Z information for at least a portion of the pixel blocks of the frame, wherein the Z information for each pixel block includes a set of compressed primary Z values, a secondary mask that indicates which pixels of the pixel block have secondary Z values, and, when indicated by the secondary mask, secondary Z values;

a Z control block operably coupled to the cache, the Z buffer, and the Z mask memory, wherein the Z control block receives coordinates corresponding to a selected pixel in the frame, wherein the Z control block determines if Z information for a selected pixel block that includes the selected pixel is included in the cached set of pixel blocks in the cache, wherein when the Z information for the selected pixel block is not included in the cached set of pixel blocks, the Z control block reads a selected Z mask value corresponding to the selected pixel block from the Z mask memory, wherein the Z control block issues at least one read command to the Z buffer based on the selected Z mask value, wherein the Z buffer returns buffered Z information corresponding to the selected pixel block in response to the at least one read command; and a decompression block operably coupled to the cache and the Z buffer, wherein the decompression block decompresses buffered Z information received from the Z buffer, wherein the decompression block decompresses the compressed primary Z values for the pixel block to produce uncompressed primary Z values that are arranged in a cache format with any secondary Z values indicated by the secondary mask, wherein the decompression block stores uncompressed Z information in the cache format in the cache.

10. The circuit of claim 9 further comprises a compression block operably coupled to the cache, the Z mask memory, and the Z buffer, wherein when an uncompressed set of Z information corresponding to a flushed pixel block is modified and flushed from the cache, the uncompressed set of Z information is compressed by the compression block to produce a compressed set of Z information that is stored in the Z buffer, wherein the compression block updates an entry in the Z mask memory corresponding to the compressed set of Z information such that the Z mask memory stores a current level of compression of the compressed set of Z information, wherein compression of the uncompressed set of Z information includes:

determining pixels in the flushed pixel block that have valid secondary Z values stored in the Z block;

constructing the secondary mask for the flushed pixel block, wherein the secondary mask indicates which pixels within the flushed pixel block have valid secondary Z values;

compressing the primary Z values for the plurality of pixels in the flushed pixel block to produce the compressed set of primary Z values for the flushed pixel block; and combining the compressed set of primary Z values, the secondary mask, and any valid secondary Z values for the flushed pixel block to produce the compressed set of Z information.

11. The circuit of claim 10, wherein each pixel in each pixel block is oversampled to produce a plurality of pixel samples, wherein each pixel sample includes a sample color value and a sample Z value, wherein the circuit further comprises:
   a sample memory that stores a plurality of pixel entries, wherein each entry of the plurality of pixel entries includes the plurality of pixel samples corresponding to one of the pixels of the frame; and
   a sample memory controller operably coupled to the sample memory and the Z controller, wherein when the sample Z values for the samples of the selected pixel cannot be reduced to the primary Z value, the secondary Z value, and the pixel mask, the sample memory fetches the plurality of pixel samples for the selected pixel from the sample memory based on a pointer, wherein the pointer is stored in place of the secondary Z value for the selected pixel as it is stored in the cache and the Z buffer.

12. The circuit of claim 10, wherein the compression block further comprises circuitry such that when the uncompressed set of Z information cannot be compressed to a compression level that exceeds a compression threshold, the compression block does not compress the uncompressed set of Z information which is then stored in uncompressed format in the Z buffer.

13. The circuit of claim 9, wherein each of the Z mask values stored in the Z mask memory is an N-bit value that encodes a plurality of compression levels.

14. The circuit of claim 13, wherein each read command issued to the Z buffer by the Z control block fetches a predetermined quantity of buffered Z information, wherein at least a portion of the plurality of compression levels correspond to multiples of the predetermined quantity.

15. The circuit of claim 9, wherein the Z buffer allocates a predetermined amount of memory for each pixel block, wherein the predetermined amount of memory is capable of storing Z information for a pixel block in uncompressed format.

16. The circuit of claim 9, wherein the cache, the Z mask memory, the Z control block, and the decompression block are included on an integrated circuit.

17. A processor for managing compressed Z information, comprising:
   a processing module;
   memory operably coupled to the processing module, wherein the memory stores operating instructions that, when executed by the processing module, cause the processor to perform the functions of:
      receiving coordinates corresponding to a pixel block of a frame, wherein the frame includes a plurality of pixel blocks, wherein each pixel block of the plurality of pixel blocks includes Z information for a plurality of pixels, wherein Z information for each pixel represents spatial depth of the pixel;
      determining if Z information for the pixel block is present in a cache;
      when the Z information for the pixel block is not present in the cache:
         reading a Z mask value for the pixel block;
         fetching the Z information for the pixel block from a Z buffer, wherein the Z mask value for the pixel block indicates a level of compression of the Z information for the pixel block in the Z buffer, wherein the Z information for the pixel block includes a primary Z value for each pixel in the pixel block, a secondary Z value for each pixel of the pixel block for which the primary Z value does not provide adequate Z coverage, a pixel mask that indicates sample coverage for each pixel of the pixel block, and a secondary mask indicating which pixels within the pixel block have secondary Z values;
         when the Z mask value indicates the Z information for the pixel block is compressed, decompressing the Z information; and
      storing the Z information for the pixel block in the cache.

18. The processor of claim 17, wherein the memory includes operating instructions that, when executed, cause the processing module to read the Z mask value such that when the Z mask value for the pixel block indicates that the Z information for the pixel block is cleared Z information, the processor stores a clear value in the cache as the Z value corresponding to each of the plurality of pixels.

19. The processor of claim 17, wherein the memory includes operation instructions that, when executed, cause the processing module to perform the additional functions of:
   modifying Z information stored in the cache corresponding to at least one of the plurality of pixels in the pixel block;
   determining pixels in the pixel block that have valid secondary Z values stored in the cache;
   constructing a revised secondary mask for the pixel block, wherein the revised secondary mask indicates which pixels within the pixel block have valid secondary Z values;
   compressing the primary Z values for the plurality of pixels in the pixel block to produce compressed primary Z information;
   storing the compressed primary Z information, the revised secondary mask, the valid secondary Z values, and the pixel masks for the plurality of pixels of the pixel block in the Z buffer at a location corresponding to the pixel block; and
   updating the Z mask value to indicate compression level of the compressed Z information.

20. The processor of claim 17, wherein each Z mask value includes a plurality of bits, wherein the plurality of bits encodes the level of compression.

21. The processor of claim 20, wherein the plurality of bits further comprises two bits, wherein encoded states of the two bits indicate four levels of compression.

* * * * *

UNITED STATES PATENT AND TRADEMARK OFFICE
CERTIFICATE OF CORRECTION

PATENT NO. : 6,407,741 B1  Page 1 of 1
DATED : August 7, 2002
INVENTOR(S) : Morein et al.

It is certified that error appears in the above-identified patent and that said Letters Patent is hereby corrected as shown below:

<u>Title page,</u>
Item [57], ABSTRACT,
Line 16, before "the correspinding pizel block", insert -- in --

<u>Column 2,</u>
Line 20, before "fragment", insert -- pixel --
Line 32, delete "pixels" and insert -- pixel --

<u>Column 3,</u>
Line 34, after "Z information" insert -- for --

<u>Column 4,</u>
Line 15, delete "makes" and insert -- make --

<u>Column 6,</u>
Line 9, delete "XXX" and insert -- 09/387,870 --
Line 13, delete "XXX" and insert -- September 1, 1999 --

<u>Column 8,</u>
Line 59, delete "block" and insert -- blocks --

<u>Column 11,</u>
Line 31, delete "a" and insert -- at --

Signed and Sealed this

Twenty-fourth Day of June, 2003

JAMES E. ROGAN
*Director of the United States Patent and Trademark Office*